US011993283B2

(12) United States Patent
Guo et al.

(10) Patent No.: US 11,993,283 B2
(45) Date of Patent: May 28, 2024

(54) SYSTEM AND METHOD FOR PERFORMING GRAPH IMPUTATION

(71) Applicant: Toyota Motor Engineering & Manufacturing North America, Inc., Plano, TX (US)

(72) Inventors: Rui Guo, San Jose, CA (US); Hongsheng Lu, San Jose, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 450 days.

(21) Appl. No.: 17/462,758

(22) Filed: Aug. 31, 2021

(65) Prior Publication Data

US 2023/0063960 A1    Mar. 2, 2023

(51) Int. Cl.
*B60W 60/00* (2020.01)
*G06F 9/30* (2018.01)
*G06V 20/58* (2022.01)

(52) U.S. Cl.
CPC ....... *B60W 60/001* (2020.02); *G06F 9/30036* (2013.01); *G06V 20/58* (2022.01);
(Continued)

(58) Field of Classification Search
CPC ......... B60W 60/001; B60W 2420/403; B60W 2554/4049; G06F 9/30036; G06V 20/50;
(Continued)

(56) References Cited

U.S. PATENT DOCUMENTS

2006/0159026 A1    7/2006  Wu et al.
2010/0149422 A1*   6/2010  Samuelsson ......... H04N 19/513
                                              348/E5.062
(Continued)

OTHER PUBLICATIONS

Jiang et al., A Graph-Based Approach for Missing Sensor Data Imputation, Oct. 15, 2021, IEEE Sensors Journal, vol. 21, pp. 23133-23144 (Year: 2021).*

(Continued)

*Primary Examiner* — Khoi H Tran
*Assistant Examiner* — Nhi Q Bui
(74) *Attorney, Agent, or Firm* — Christopher G. Darrow; Darrow Mustafa PC

(57) ABSTRACT

Described are systems and methods for substituting missing graph information caused during the transmission of graph information from one entity to another. In one example, a system includes a processor and a memory with machine-readable instructions that cause the processor to receive an incoming graph stream comprising a plurality of graphs having detected object information and at least one missing graph, transform the plurality of graphs into incoming embedded vectors having values that represent detected object information of the incoming graph stream, provide the embedded vector that corresponds to the at least one missing graph with a missing graph value, and substitute the missing graph value with a substitute value using a recurrent neural network that interpolates the substitute value using the incoming embedded vectors that are not equal to the missing graph value.

20 Claims, 11 Drawing Sheets

(52) U.S. Cl.
CPC ............... *B60W 2420/403* (2013.01); *B60W 2554/4049* (2020.02)

(58) Field of Classification Search
CPC ........ G06V 10/74; G06V 10/82; G06N 3/044; G06N 3/09
See application file for complete search history.

(56) References Cited

U.S. PATENT DOCUMENTS

| | | | |
|---|---|---|---|
| 2018/0217595 A1* | 8/2018 | Kwon | G06N 5/02 |
| 2019/0319868 A1 | 10/2019 | Svennebring et al. | |
| 2020/0153902 A1 | 5/2020 | Higuchi et al. | |
| 2020/0284590 A1* | 9/2020 | Chen | G01C 21/3804 |
| 2021/0182539 A1* | 6/2021 | Rassool | G06V 30/19173 |
| 2021/0183238 A1 | 6/2021 | Guo et al. | |

OTHER PUBLICATIONS

Gao et al., Regularized Graph Matching for Correspondence Identification under Uncertainty in Collaborative Perception, Jul. 12-16, 2020, Robotics: Science and Systems 2020, 10 pages (Year: 2020).*

Gao et al., "Regularized Graph Matching for Correspondence Identification Under Uncertainty in Collaborative Perception," Robotics: Science and Systems 2020, Corvalis, Oregon, USA, Jul. 12-16, 2020, 10 pages.

Wang et al., "Motion Estimation of Connected and Automated Vehicles under Communication Delay and Packet Loss of V2X Communications," pp. 1-8, arXiv:2101.07756v1 [eess.SY] Jan. 19, 2021.

Spinelli et al., "Efficient data augmentation using graph imputation neural networks," pp. 1-9, arXiv:1906.08502v1 [stat.ML] Jun. 20, 2019.

Vinel et al., "Modeling of V2V Communications for C-ITS Safety Application: A CPS Perspective," IEEE Communications Letters, vol. 22, No. 8, pp. 1600-1603 (2018).

Unknown, "TensorFlow Document: Masking and Padding with Keras," 11 pages, Last accessed Aug. 31, 2021, (Found at: https://www.tensorflow.org/guide/keras/masking_and_padding).

* cited by examiner

SYSTEM AND METHOD FOR PERFORMING GRAPH IMPUTATION

TECHNICAL FIELD

The subject matter described herein relates, in general, to systems and methods for substituting missing graph information that may occur during the wireless transmission of graph information from one entity to another.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some current vehicles have perception systems that include sensors that allow them to perceive the environment around them. One or more vehicle processors can use information from perception systems to provide autonomous and/or semi-autonomous functionality. For example, a vehicle equipped with the appropriate perception system may pilot itself with minimal or no human input. In other examples, the vehicle may provide safety or convenience-related features, such as automatic emergency braking, intelligent cruise control, lane keep assist, and the like.

Some current vehicles also can communicate with other vehicles. As such, vehicles can provide information to another vehicle, including information detected by a perception system. Information shared from one vehicle to another, such as detected object information detected by the vehicle's perception system, is generally packaged in the form of graphs. Graphs provide a graph representation to represent multiple objects observed by a perception system. In one example, a graph may include nodes that denote objects and are associated with attribute vectors and the edges among the nodes to describe the spatial relationship among the objects.

When vehicles share graph information, they usually transmit graph information using a number of different wireless communication methodologies, such as cellular, Wi-Fi, Dedicated Short Range Communications, among others. During this transmission of information, graph information may be subject to packet loss, where graph information fails to reach its intended destination.

SUMMARY

This section generally summarizes the disclosure and does not comprehensively explain its full scope or all its features.

In one embodiment, a system includes a processor and a memory with machine-readable instructions. The machine-readable instructions cause the processor to receive an incoming graph stream comprising a plurality of graphs having detected object information and at least one missing graph, transform the plurality of graphs into incoming embedded vectors having values that represent detected object information of the incoming graph stream, provide the embedded vector that corresponds to the at least one missing graph with a missing graph value, and substitute the missing graph value with a substitute value using a recurrent neural network that interpolates the substitute value using the incoming embedded vectors that are not equal to the missing graph value.

In another embodiment, a method includes the steps of receiving an incoming graph stream comprising a plurality of graphs having detected object information and at least one missing graph, transforming the plurality of graphs into incoming embedded vectors having values that represent detected object information of the incoming graph stream, providing the embedded vector that corresponds to the at least one missing graph with a missing graph value, and substituting the missing graph value with a substitute value using a recurrent neural network that interpolates the substitute value using the incoming embedded vectors that are not equal to the missing graph value.

In yet another embodiment, a non-transitory computer readable medium includes instructions that, when executed by a processor, cause the processor to receive an incoming graph stream comprising a plurality of graphs having detected object information and at least one missing graph, transform the plurality of graphs into incoming embedded vectors having values that represent detected object information of the incoming graph stream, provide the embedded vector that corresponds to the at least one missing graph with a missing graph value, and substitute the missing graph value with a substitute value using a recurrent neural network that interpolates the substitute value using the incoming embedded vectors that are not equal to the missing graph value.

Further areas of applicability and various methods of enhancing the disclosed technology will become apparent from the description provided. The description and specific examples in this summary are intended for illustration only and do not limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Described are a system and method for performing graph imputation. Moreover, as explained in the background section, connected vehicles can communicate with each other, allowing them to share information. In some situations, the information to be shared may be a graph stream that is a collection of graphs. A single graph may provide a graph representation to represent multiple objects observed by the vehicle's perception system. When communicating, there may be situations where one or more graphs that form the graph streams are subject to packet loss and are not received by the intended vehicle. The system and method described in this description provide a solution for substituting the missing graph with a substitute graph generated using a Mask recurrent neural network ("RNN").

Upon receiving the graph stream that includes at least one missing graph, the system and method can transform each graph into embedded vectors to standardize the format of the information contained in the graphs. Missing graphs are given a missing graph value, which may be a zero or a null value. From there, the Mask RNN interpolates a substitute value for the embedded vector that represents the missing graph using the other embedded vectors. The interpolation may be a bidirectional serial analysis. Once the substitute value is interpolated, the substitute value is utilized along with the other embedded vectors to generate a global feature space.

Figure 1:
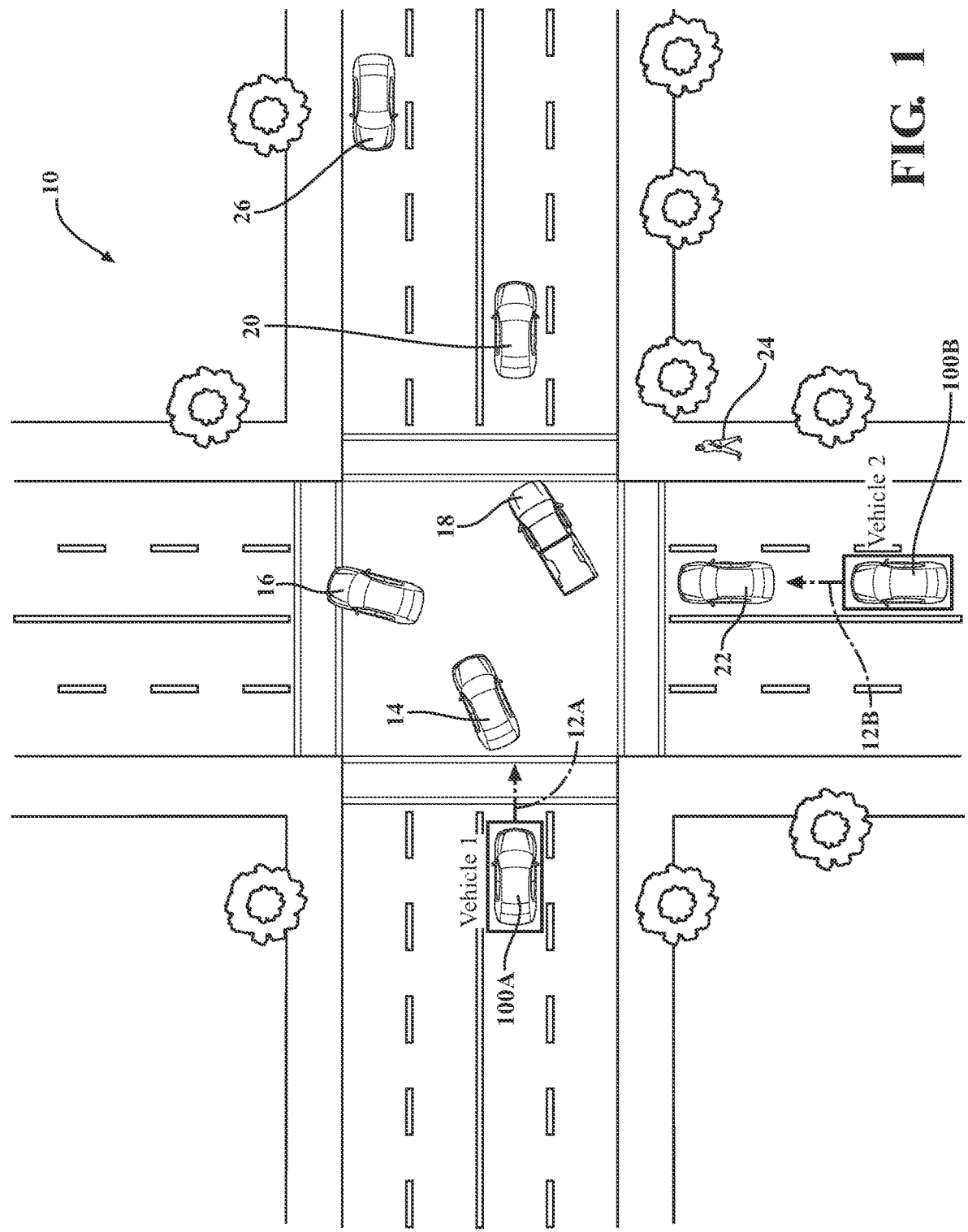
FIG. 1 illustrates a traffic scene having two vehicles that can communicate graph information between each other.

To briefly introduce the problem solved by the described systems and methods, reference is made to FIG. 1. Here, a traffic scene 10 is illustrated that contains numerous objects. Also illustrated are a first vehicle 100A and a second vehicle 100B having perception systems that can detect objects within the traffic scene 10. In this example, the first vehicle 100A and the second vehicle 100B are connected vehicles and can communicate via a wireless communication methodology. The communication methodology can be any communication methodology that allows the wireless transmission of information between two different entities, such as the first vehicle 100A and the second vehicle 100B. For example, the communication methodology could be cellular, Wi-Fi, Dedicated Short Range Communications, or any other suitable wireless communication methodology that allows data transmission from one point to another.

In this example, the first vehicle 100A and the second vehicle 100B can communicate detected object information to each other provided in the form of graphs. As explained previously, graphs provide a graph representation to represent multiple objects observed by a perception system. In one example, a graph may include nodes that denote objects and are associated with attribute vectors and the edges among the nodes to describe the spatial relationship among the objects. As such, the first vehicle 100A and the second vehicle 100B can benefit from each other's perception system by sharing with each other detected object information in the form of graphs.

The graphs transmitted between the first vehicle 100A and the second vehicle 100B are in the form of a graph stream that includes a plurality of graphs. To make this information useful, as will be explained in more detail later, graphs from an incoming graph stream must be appropriately interpreted. This interpretation involves synchronizing and matching graphs so that objects, represented as nodes in the graphs, can be appropriately matched to objects that the receiving vehicle has already detected.

Figure 2:
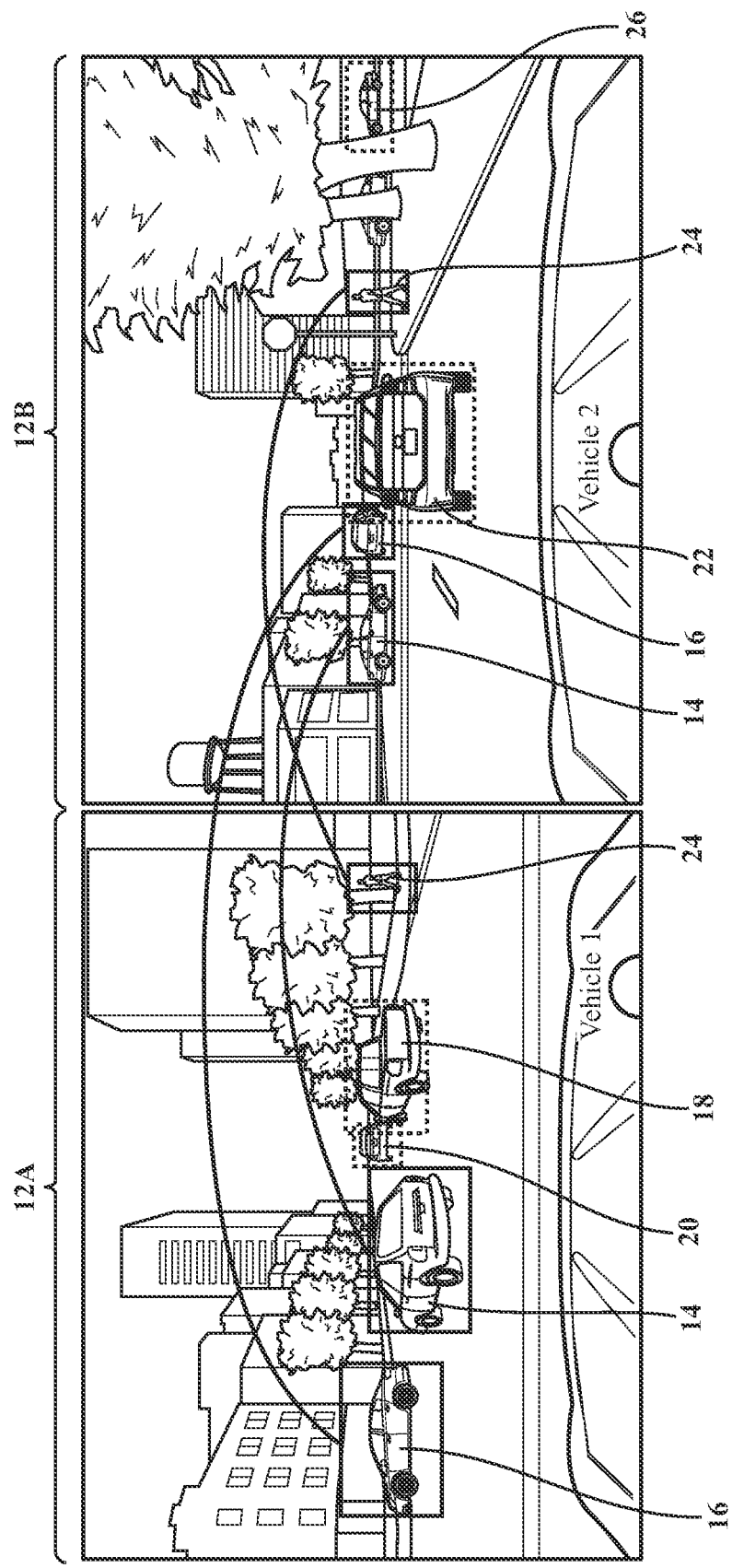
FIG. 2 illustrates two different views from two different vehicles of FIG. 1 that show the relation between the objects detected between the two views.

As such, FIG. 2 illustrates a first field-of-view 12A corresponding to the field-of-view of the first vehicle 100A and a second field-of-view 12B corresponding to the field-of-view of the second vehicle 100B. In this example, the first field-of-view 12A, the perception system of the first vehicle 100A can detect objects 14, 16, 18, 20, and 24. In the second field-of-view 12B, the perception system of the second vehicle 100B can detect objects 14, 16, 22, 24, and 26. The objects 14, 16, and 24 are common to both fields of view. Only the first vehicle 100A can detect objects 18 and 20, while only the second vehicle 100B can detect objects 22 and 26.

Here, by performing the appropriate matching of the graphs of the incoming graph streams, the first vehicle 100A and the second vehicle 100B can determine which graphs relate to each other in which objects relate to each other. However, there are situations where the incoming graph stream transmitted by one vehicle and received by the other experiences packet loss, where one or more graphs are essentially dropped. Missing graph information increases the difficulty of determining matching objects. The systems and methods described in this description can interpolate substitute graphs to replace missing graphs that had been dropped.

Figure 3:
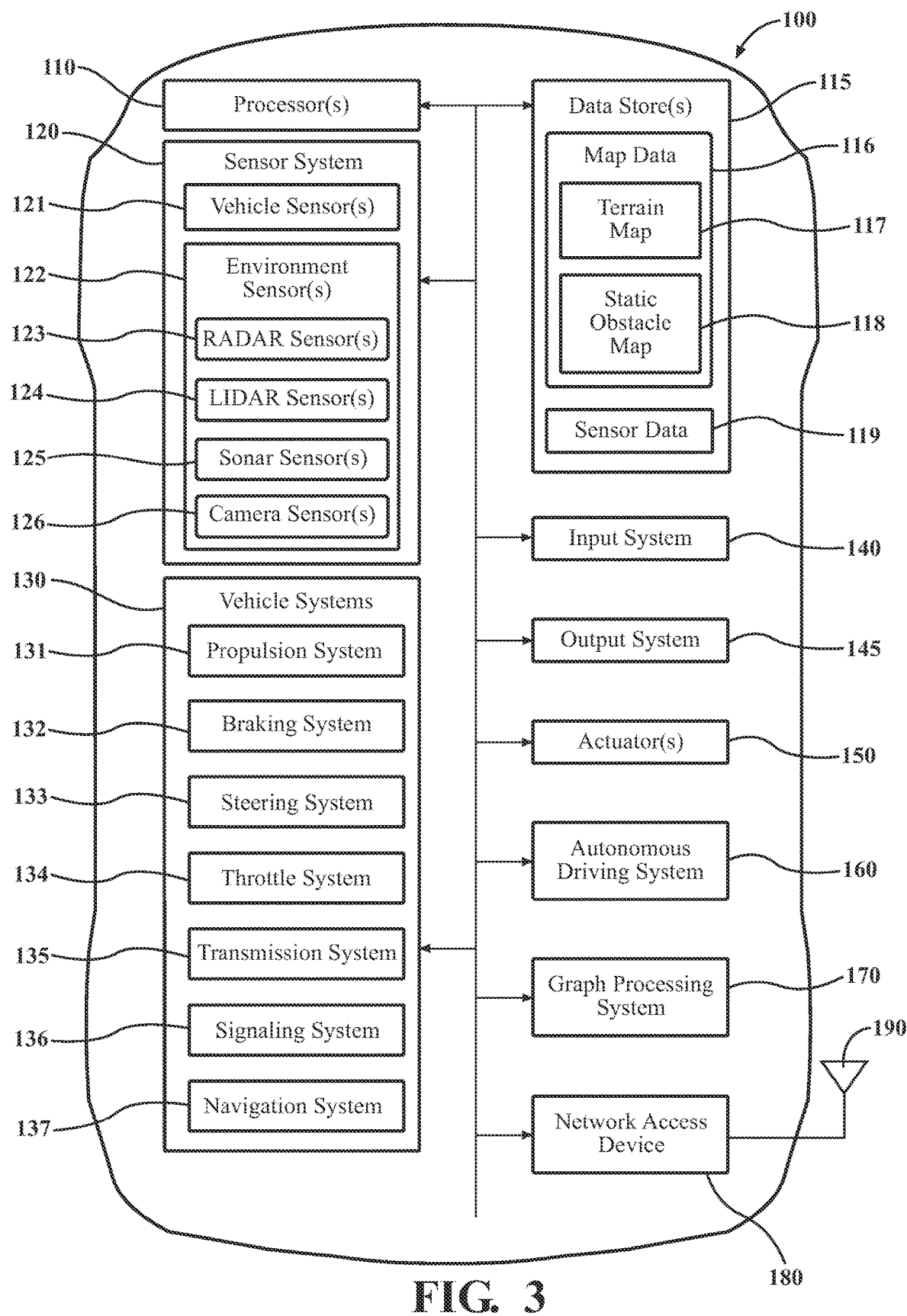
FIG. 3 illustrates a vehicle incorporating a graph processing system.

Referring to FIG. 3, an example of a vehicle 100 is illustrated that can perform graph imputation. The vehicle 100 may be similar to the first vehicle 100A and/or 100B of FIGS. 1 and 2. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments, it may not be necessary for the vehicle 100 to have all of the elements shown in FIG. 3. The vehicle 100 can have any combination of the various elements shown in FIG. 3. Further, the vehicle 100 can have additional elements to those shown in FIG. 3. In some arrangements, the vehicle 100 may be implemented without one or more of the elements shown in FIG. 3. While the various elements are shown as being located within the vehicle 100 in FIG. 3, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 3 and will be described along with subsequent figures. However, a description of many of the elements in FIG. 3 will be provided after the discussion of FIGS. 4-13 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a graph processing system 170. The graph processing system 170 may perform any of the methodologies disclosed in this description. In one example, the graph processing system 170 can store both incoming graph streams and locally generated graph streams in a buffer, perform graph matching of the graph streams, perform graph embedding of the graph streams, substitute missing graph information by interpolating the missing graph information using a Mask RNN, and/or generate a global feature space based on the incoming and locally generated graph streams.

With reference to FIG. 2, one embodiment of the graph processing system 170 is further illustrated. As shown, the graph processing system 170 includes one or more processor(s) 110. Accordingly, the processor(s) 110 may be a part of the graph processing system 170, or the graph processing system 170 may access the processor(s) 110 through a data bus or another communication path. In one or more embodiments, the processor(s) 110 is an application-specific integrated circuit that is configured to implement functions associated with a graph generator module 202, a graph matching module 204, a graph imputation module 206, and/or a state estimation module 208. In general, the processor(s) 110 is an electronic processor such as a microprocessor that is capable of performing various functions as described herein.

In one embodiment, the graph processing system 170 includes a memory 200 that stores the graph generator module 202, the graph matching module 204, the graph imputation module 206, and/or the state estimation module 208. The memory 200 is a random-access memory (RAM), read-only memory (ROM), a hard disk drive, a flash memory, or other suitable memory for storing the graph generator module 202, the graph matching module 204, the graph imputation module 206, and/or the state estimation module 208. The graph generator module 202, the graph matching module 204, the graph imputation module 206, and/or the state estimation module 208 are, for example, computer-readable instructions that, when executed by the processor(s) 110, cause the processor(s) 110 to perform the various functions disclosed herein.

Furthermore, in one embodiment, the graph processing system 170 includes one or more data store(s) 210. The data store(s) 210 is, in one embodiment, an electronic data structure such as a database that is stored in the memory 200 or another memory and that is configured with routines that can be executed by the processor(s) 110 for analyzing stored data, providing stored data, organizing stored data, and so on. Thus, in one embodiment, the data store(s) 210 stores data used by the graph generator module 202, the graph matching module 204, the graph imputation module 206, and/or the state estimation module 208 in executing various functions.

In one example, the data store(s) 210 may store the sensor data 212 generated by the sensor system 120 of the vehicle 100. The sensor data 212 can be sensor data collected by one or more environment sensor(s) 122 that form part of a perception system, such as radar sensor(s) 123, LIDAR sensor(s) 124, sonar sensor(s) 125, camera sensor(s) 126, or other types of perception related sensors. The data store(s) 210 may also store in a buffer 220 received graphs 222 and generated graphs 224. The received graphs 222 may be one or more graphs received from an external entity, such as another vehicle. The received graphs 222 may be in the form of a collection of graph streams. The generated graphs 224 may be graphs that have been generated locally based on the sensor data 212 collected by the vehicle 100. The received graphs 222 are external graphs generated by others, while the generated graphs 224 are internal graphs, locally generated by the vehicle 100.

The data store(s) 210 may store an RNN referred to as a Mask RNN 230. The Mask RNN 230, as will be explained later, can perform interpolation to create substitute values of missing graphs. The Mask RNN 230 may be trained off-line using any one of a number of different training methodologies. In one example, the Mask RNN 230 is trained in a supervised fashion, wherein one or more model weights 232 are adjusted based on a loss determined by a loss function.

Figure 4:
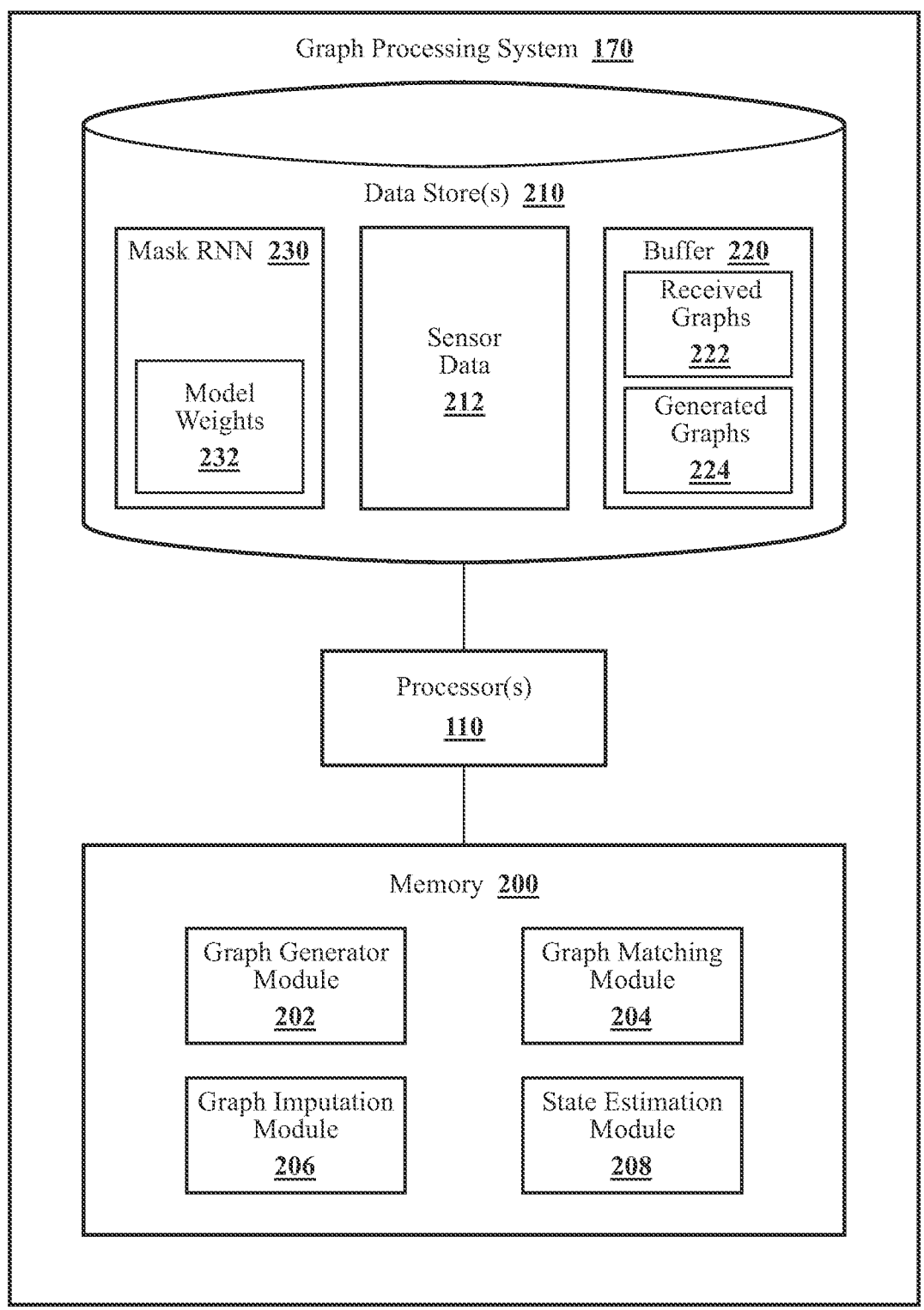
FIG. 4 illustrates a more detailed view of the graph processing system of FIG. 3.
Figure 5:
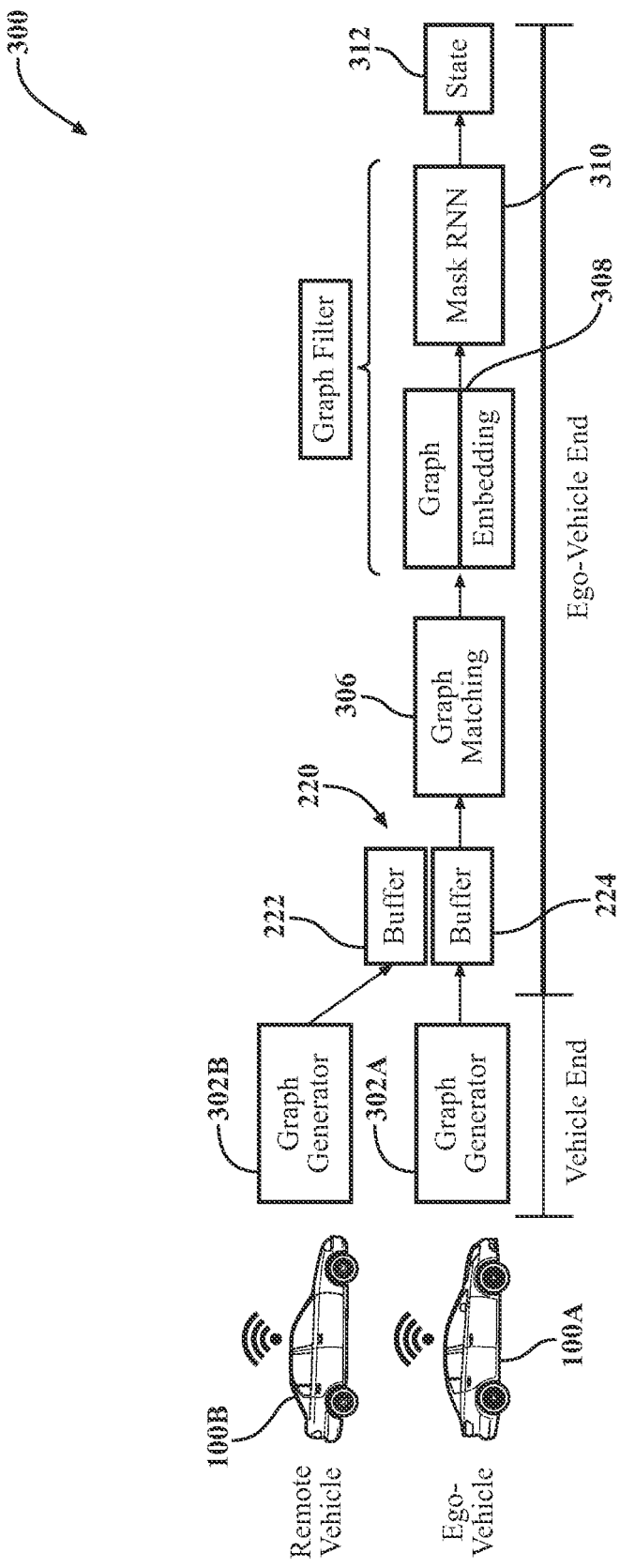
FIG. 5 illustrates a process pipeline of graph imputation in a connected vehicular system.

To better understand and provide a brief overview of the processes performed by the graph processing system 170 of FIG. 4, reference is made to FIG. 5, which illustrates a pipeline 300 of processes performed by the graph processing system 170. A more detailed explanation of each process in the pipeline 300 will be provided after this introduction. In this example, the first vehicle 100A, which may be similar to the vehicle 100 in FIG. 3, collects sensor data from the environment sensor(s) 122. The sensor data can include information regarding objects detected near the first vehicle 100A. The sensor data may be processed to determine the location of objects, object attributes, such as type, direction, velocity, and the like. Using this information, the graph generator module 202 causes the processor(s) 110 to generate a graph, which is a graph representation to represent multiple objects observed by the environment sensor(s), which may form a perception system and is illustrated in block 302A. Multiple graphs may be generated at different time intervals to describe the environment surrounding the first vehicle 100A at a particular time. A full description of how graphs are generated will be described later in this description.

At the same time that the first vehicle 100A is generating one or more graphs, the second vehicle 100B may also be generating graphs, as illustrated in block 302B. In this example, the second vehicle 100B transmits the graphs it has generated to the first vehicle 100A via a wireless communication methodology. Upon receiving the graphs from the second vehicle 100B, the received graphs are stored as the received graphs 222 within the buffer 220 of FIG. 4. In like manner, the generated graphs locally generated by the first vehicle 100A are stored as the generated graphs 224 within the buffer 220.

Continuing down the pipeline 300, the graph matching module 204 has instructions that cause the processor(s) 110 to perform graph matching, as indicated in block 306. A detailed description regarding how graph matching will be described later in the specification. Broadly, graph matching may be performed by matching the nodes of each graph and/or the edges of each graph to determine when a match occurs. One example of graph matching, as well as some other graph processing and generation-related features, is described in U.S. Pat. App. Pub. No. 2021/0183238 to Guo et al., which is hereby incorporated by reference in its entirety.

Next, at block 308, the graph imputation module 206 has instructions that cause the processor(s) 110 to transform the graphs stored within the buffer 220 into embedded vectors. Moreover, graphs generated from different points of view have different properties, such as the number of vertexes, edges, links, and represented topologies. At block 308, the graphs are transformed into a vector with a unified length, thus allowing the graphs from different sources to become comparable. This type of graph embedding changes the format of the graphs without losing the generalization of the graphs.

At block 310, the graph imputation module 206 has instructions that cause the processor(s) 110 to substitute any missing graph values from the received graphs 222 that were previously converted into embedded vectors. Missing graphs that are converted into embedded vectors are provided a zero value to indicate that they are missing. As will be explained in greater detail later, the Mask RNN 230 can determine a substitute value by performing interpolation by performing analysis of the embedded vectors of the other received graphs.

At block 312, the state estimation module 208 has instructions that cause the processor(s) 110 to construct a global feature space using the embedded vectors generated from both the generated graphs 224 and the received graphs 222, including the interpolated embedded vectors representing missing graphs.

Figure 6:
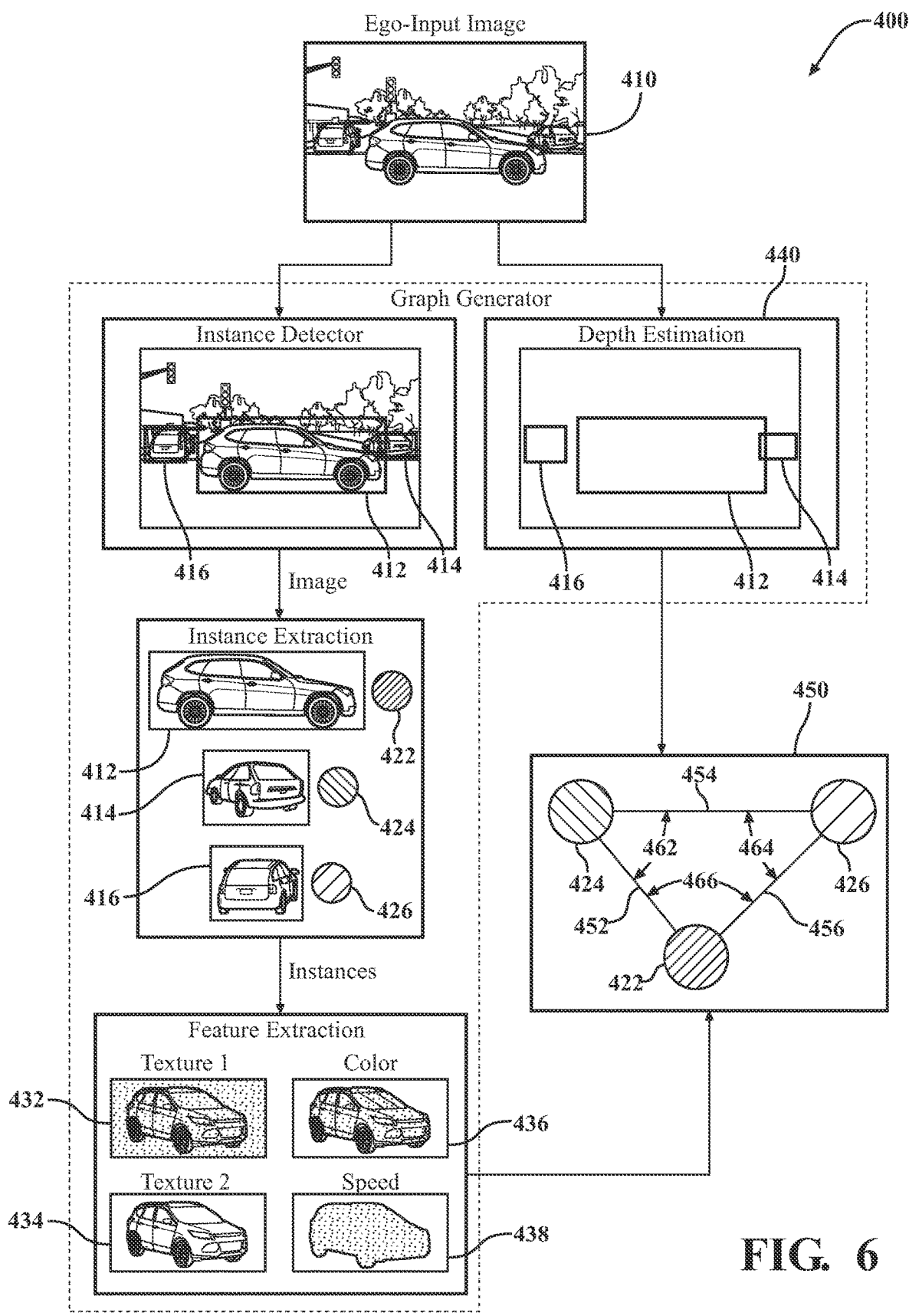
FIG. 6 illustrates the generation of a graph from an image captured by a vehicle.

Regarding generating a graph, such as accomplished in block 302A and block 302B by the first vehicle 100A and the second vehicle 100B, reference is made to FIG. 6, which illustrates an overview 400 for generating a graph. In this example, the graph generator module 202 includes instructions that cause the processor(s) 110 to obtain an image 410 from the environment sensor(s) 122. In this example, the image 410 may be captured by the camera sensor(s) 126.

Once the image 410 is captured, the graph generator module 202 may cause the processor(s) 110 to segment the image 410 into one or more instances 412, 414, and/or 416. Each segmented instance may be converted into a node feature representation. For example, the instance 412 may be converted into a node 422, the instance 414 may be converted into a node 424, and the instance 416 may be converted into a node 426. While the instances 412, 414, 416 are all vehicles in FIG. 6, instances may be persons (e.g., pedestrians), animals, construction barriers, emergency road kits, and the like.

Next, the graph generator module 202 may cause the processor(s) 110 to extract texture features, color features, speed features, and the like from the instances 412, 414, and/or 416. For example, FIG. 6 illustrates texture features 432 and 434, color features 436, and speed features 438 extracted from the instance 412. The color features may include the color or color histogram of the instance 412. The texture features may include information about texture such as Histogram of Oriented Gradients (HOG), Scale-invariant Feature Transform (SIFT), and Speeded Up Robust Features (SURF). A deep feature from a deep neural network-based detector may also be considered as a general texture feature. The extracted features may also include class labels (e.g., category information).

The graph generator module 202 may then cause the processor(s) 110 to assign the extracted features to each of the plurality of nodes. In embodiments, the extracted features may be encoded to a corresponding node. For example, the features 432, 434, 436, 438 extracted from the instance 412 are encoded to node 422. Similarly, the features extracted from the instance 414 may be encoded to the node 424, and the features extracted from the instance 416 may be encoded to the node 426. In some embodiments, speed information for instances 412, 414, 416 may be encoded to nodes 422, 424, 426, respectively.

The graph generator module 202 may cause the processor(s) 110 to determine relational information among the plurality of instances. The relational information may include, but not be limited to, a geometric distance and observation angle. Depth estimation is implemented as shown in an image 440 captured by one or more ranging sensors, such as the radar sensor(s) 123, the LIDAR sensor(s) 124, and/or the sonar sensor(s) 125 of FIG. 3. The processor(s) 110 may calculate geometric distances and/or observation angles among nodes based on the depth information. For example, the processor(s) 110 may calculate geometric distances among the instances 412, 414, 416, and/or angles among the instances 412, 414, 416 based on information obtained from ranging sensors.

The graph generator module 202 may also cause the processor(s) 110 to generate a graph including a plurality of nodes representing the plurality of instances and a plurality of edges representing the relational information among the plurality of instances. For example, the processor(s) 110 may generate a graph 450 including the nodes 422, 424, 426 that correspond to the instances 412, 414, 416, respectively, and a plurality of edges. The plurality of edges may include information on geometric distances among the instances 412, 414, 416 and/or information about angles among the instances 412, 414, 416. For example, the geometric distances among the instances may be represented as lines 452, 454, 456.

The angles 462, 464, and 466 represent angles among the instances 412, 414, and 416 formed based on the relative locations of instances 412, 414, and 416, respectively. While the graph 450 shows a triangular shape, a different shape may be formed based on the number of instances and distances between the instances. For example, the graph may be a quadrangle if the number of instances is four. As another example, the graph may be a hexagon if the number of instances is six. The graph may be dynamically formed based on the location and/or speed of the instances. For example, if one or more of the instances are moving, the graph may be dynamically changed based on the moving locations of the instances.

As such, the example and methodology provided in generating the graph 450 may be performed by one or more the processors of the first vehicle 100A and the second vehicle 100B. It should be understood that this is just but one way of generating a graph. Graphs may be generated using a number of different methodologies, not just those described in the paragraphs above.

Figure 7:
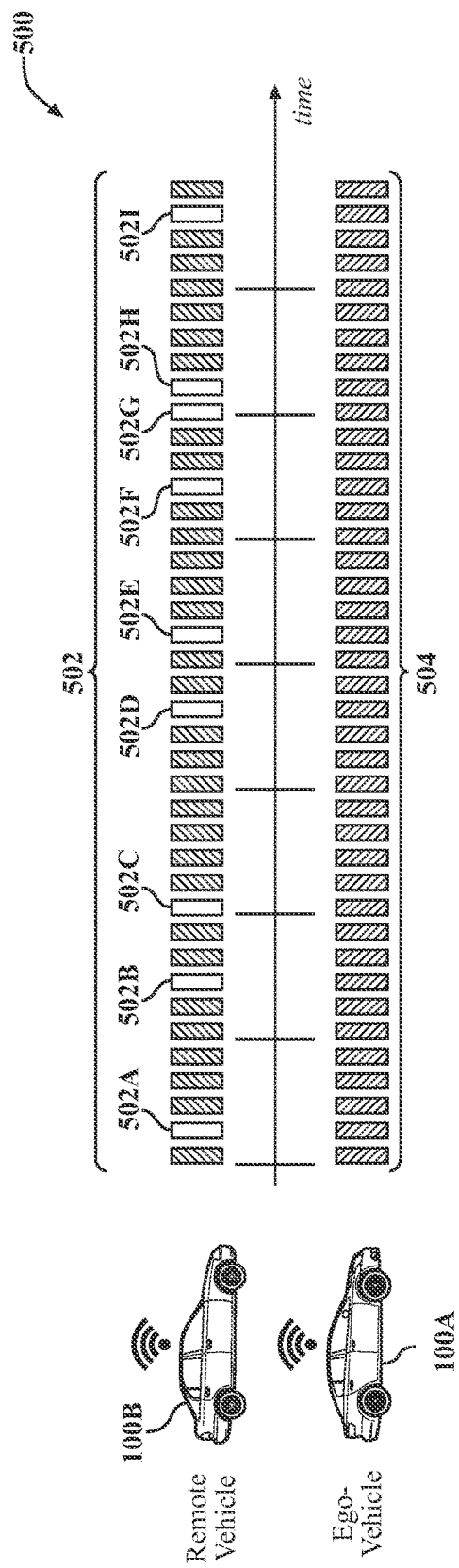
FIG. 7 illustrates a vehicle-to-vehicle communication experiencing packet loss.

Referring to FIG. 7, illustrated are both the first vehicle 100A and the second vehicle 100B. Also illustrated are two graph streams 500. The graph stream 502 is a stream of graphs received by the first vehicle 100A from the second vehicle 100B. As such, the graph stream 502 may be stored as the received graphs 222 within the buffer 220 of FIG. 4. The graph stream 504 is the locally generated graphs that are generated by the first vehicle 100A that may be stored as the generated graphs 224 within the buffer 220. Because the first vehicle 100A generated the graph stream 504, the graph stream 504 is not subject to transmission loss. However, because the graph stream 502 was transmitted to the first vehicle 100A from the second vehicle 100B, the graph stream 502 may be subject to packet loss. Packet loss results in missing graphs as indicated by missing graphs 502A-5021.

The graph matching module 204 may cause the processor(s) 110 to synchronize the graph stream 502 and the graph stream 504 using a time-based synchronization. As such, graphs can be synchronized with each other using a timestamp. For example, if graph generation is at 10 frames per second rate and the communication processing is at 2 Hz, which means in a second time, there are two times that vehicles are exchanging the information with their collaborators. For one time information exchange, the vehicle may send out 5 frames of graph representation. In that 5 frames graph information, there may be some frames lost or sent in blank.

Figure 8:
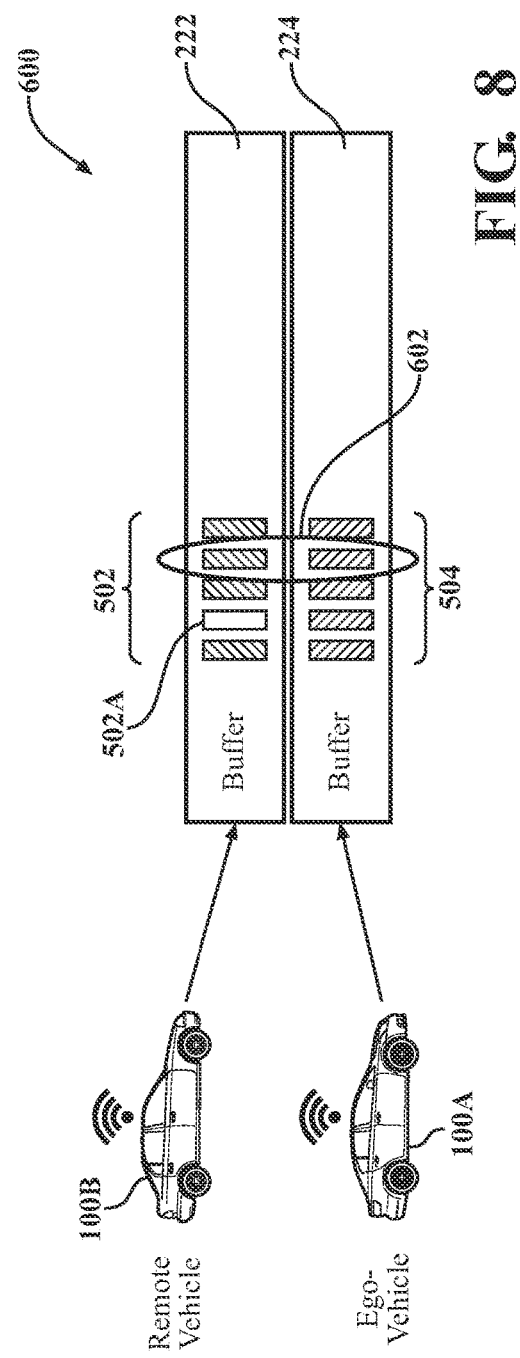
FIG. 8 illustrates a random graph picking for performing a matching process for matching graphs.

As best shown in FIG. 8, once the generated graphs 600 of the graph stream 504 and the received graphs of the graph stream 502 are stored within the buffer 220 as received graphs 222 and generated graphs 224, respectively, the graph matching module 204 may cause the processor(s) 110 to perform graph matching using one nonempty paired graph frame 602. The graph pair picking may be random. The matching process is a similarity comparison process based on a special distance metric. Metrics decomposition and computation may be involved in conducting further optimization and robust matching.

Figure 9:
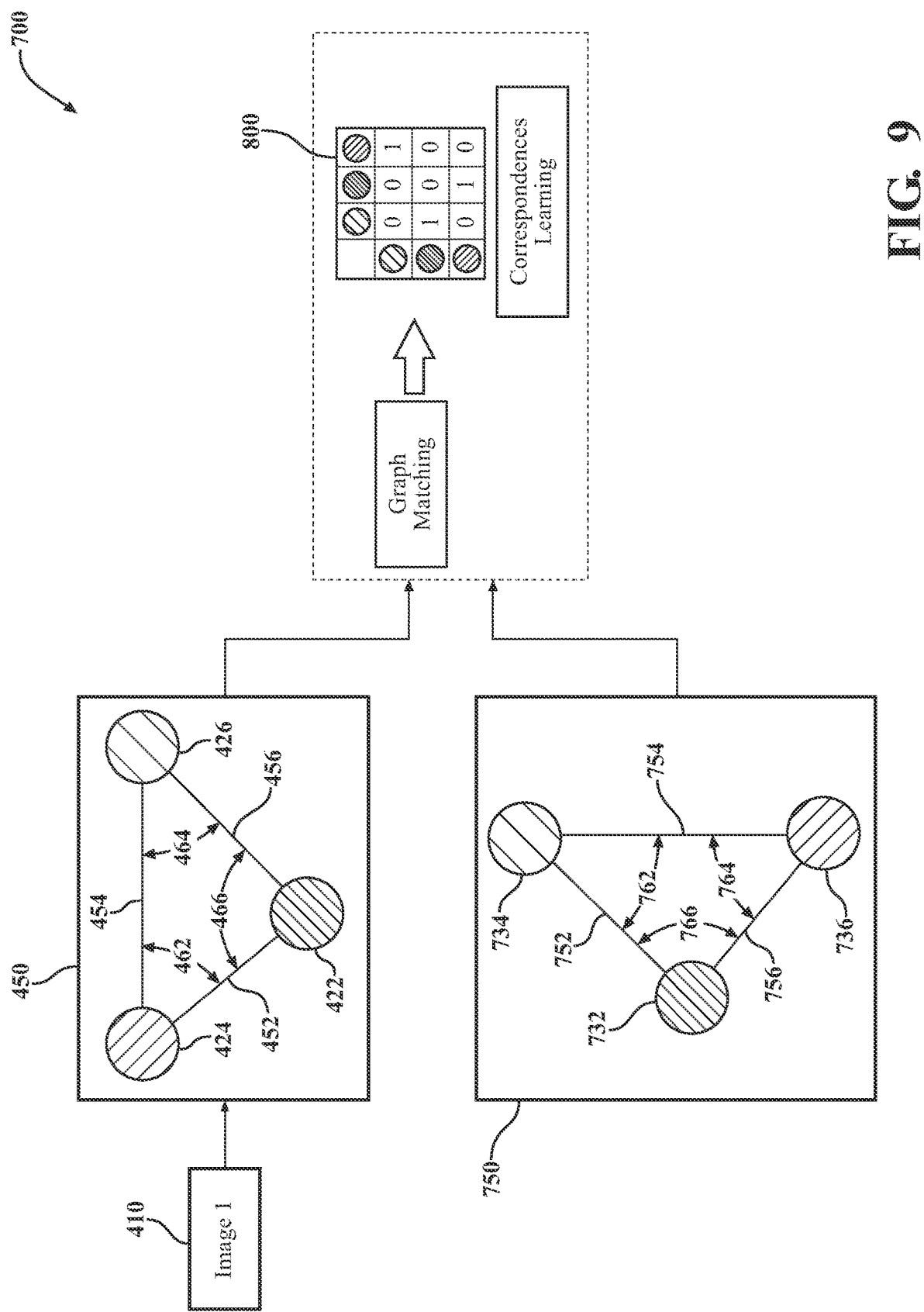
FIG. 9 illustrates the matching of a first graph with a second graph.

Referring to FIG. 9, one example 700 of graph matching is shown, wherein matching is performed between the graph 450 and another graph 750 that may have been transmitted from another vehicle. Similar to the graph 450, the graph 750 includes nodes 732, 734, and 736 representing objects. Like before, the geometric distances between the nodes 732, 734, and 736 may be represented as lines 752, 754, and 756. The graph 750 also includes angles 762, 764, and 766 of the lines 752, 754, and 756.

Here, the graph matching module 204 may cause the processor(s) 110 to match the graph 450 with the graph 750. The matching process may be a similarity comparison process based on a special distance metric. The theoretical principle behind the matching process is the view-invariant property of the scene. Metrics decomposition and computation may be involved to conduct further optimization and robust matching. For example, the nodes 422, 424, 426 of the graph 450 may be compared with the nodes 732, 734, 736 of the graph 750. A table 800 may show correspondences between the nodes 422, 424, 426 and the nodes 732, 734, 736.

Based on the features encoded in each node, the processor(s) 110 may determine that the node 422 corresponds to the node 732, the node 424 corresponds to the node 734, and the node 426 corresponds to the node 736. As another example, the angles 462, 464, 466 may be compared with the angles 762, 764, 766. Specifically, the angle 462 may match the angle 762, the angle 464 may match the angle 764, and the angle 466 may match the angle 766. A neural network utilized by the processor(s) 110 may be trained off-line with a labeled dataset to supervise parameter tuning to facilitate the best matching result.

Figure 10:
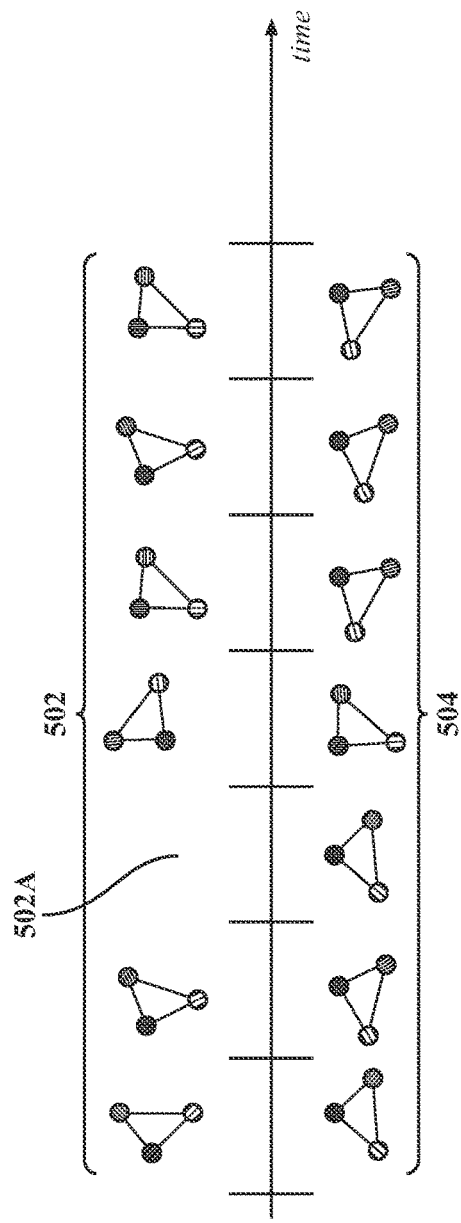
FIG. 10 illustrates an example of graphs generated by one vehicle and graphs received by the vehicle from another vehicle.
Figure 10:
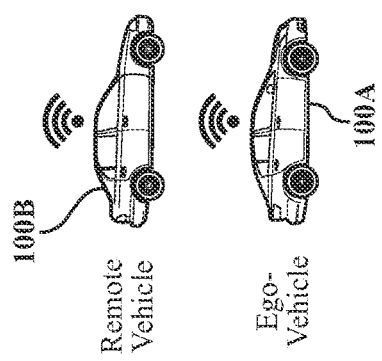

After matching, the correspondences between the two graphs are established. This process is continued as graphs generated by the first vehicle 100A can be matched with corresponding graphs generated by the second vehicle 100B and received by the first vehicle 100A. FIG. 10 illustrates a portion of the received graph stream 502 matched with the generated graph stream 504. However, in this example, the received graph stream 502 has a missing graph 502A. As explained previously, the missing graph 502A may have been caused due to packet loss that sometimes occurs during the wireless data transmission.

Figure 11:
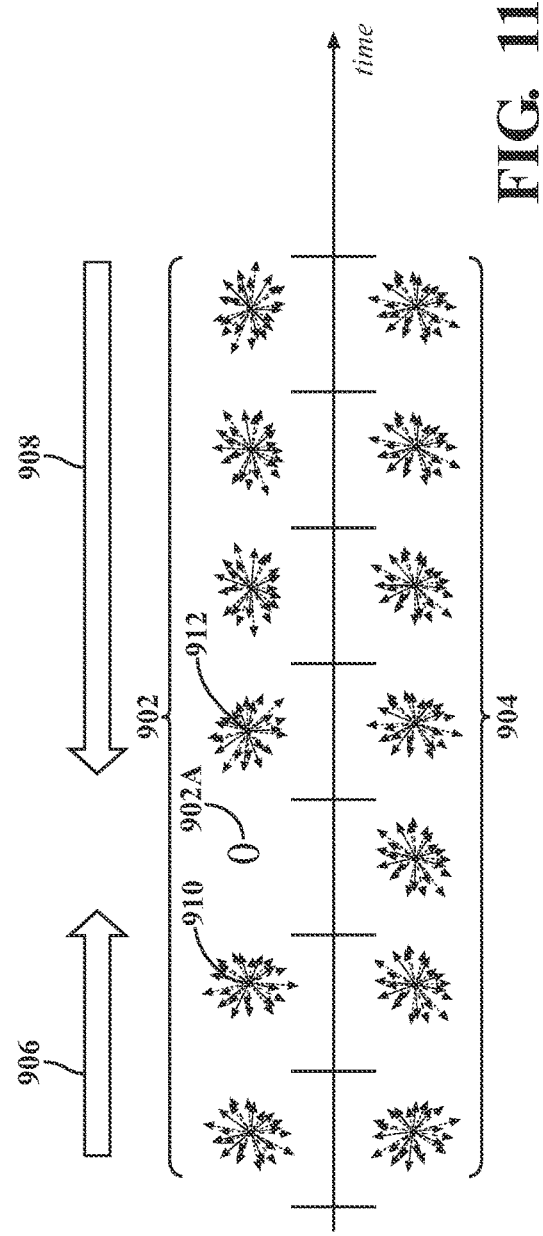
FIG. 11 illustrates the conversions of the graphs of FIG. 10 to embedded vectors.
Figure 11:
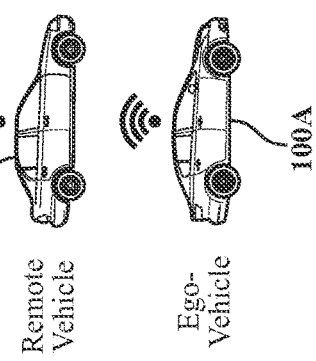

The graph processing system 170 of FIG. 2 can create a substitute for the missing graph 502A. Here, the graph imputation module 206 includes instructions that, when executed by the processor(s) 110, cause the processor(s) 110 to transform the graphs of the graph stream 502 into embedded vectors 902, as best shown in FIG. 11. As the graph stream 502 has a missing graph 502A, the values of the embedded vector that correspond to the missing graph 502A are provided a missing graph value 902A. In this example, the missing graph value is a zero. The graph imputation module 206 or another module may cause the processor(s) 110 to convert the generated graph stream 504 into embedded vectors 904.

One reason for converting the graph streams 502 and/or 504 into embedded vectors is that the graphs that form the graph streams are generated from different points of view and have different properties such as vertexes, edges, links, and represented topologies. Transforming the graphs into embedded vectors transforms the data structures of the graphs into a vector with unified lengths. Thus, the graphs from different sources become comparable. Graph embedding has a different format but does not lose the generalization. A neural network may be utilized to perform the embedding that encodes the property of a graph into a unified vector with fixed dimensionality that preserves the topology, node-to-node relationship, and neighborhood relationships of the graph.

Next, the graph imputation module 206 includes instructions that, when executed by the processor(s) 110, cause the processor(s) 110 to determine a substitute value to replace the missing graph value 902A. Here, the Mask RNN 230 of FIG. 4 may be utilized to interpolate the substitute value based on one or more of the embedded vectors 902. The Mask RNN 230 may selectively process the non-masked values (i.e., non-zero values) of the embedded vectors 902 and ignores embedded vectors with a zero value. For its output, the Mask RNN 230 may smoothly interpolate the substitute value. In one example, the Mask RNN 230 may perform a serial analysis of the embedded vectors 902 that do not have a zero value to interpolate the substitute value. The serial analysis may be unidirectional or bidirectional, as indicated by the arrows 906 and 908.

In another example, the mask RNN 230 may determine the substitute value by copying one of the embedded vectors 902, such as the embedded vectors that may be sequentially closest to the missing graph value 902A. In this example, the Mask RNN 230 may utilize values of the vectors 910 and/or 912 as the substitute value. Additionally or alternatively, may perform some type of averaging of the vectors 910 and/or 912 to determine the substitute value that will be utilized to replace the missing graph value 902A. Once an appropriate substitute value has been determined by the Mask RNN 230, the substitute value will be utilized to replace the missing graph value 902A.

The state estimation module 208 includes instructions that, when executed by the processor(s) 110 determining global feature space. The global feature space may be determined by utilizing the embedded vectors 902 and the embedded vectors 904. As explained previously, any of the embedded vectors 902 that had a zero value, have been replaced with substitute values generated by the Mask RNN 230. The global feature space may be an electronic environment of an area co-visible between the vehicles, such as the first vehicle 100A and the second vehicle 100B. In one example, the state estimation module 208 causes the processor(s) 110 to concatenate the local embedded vectors 904 with the incoming embedded vectors 902 to form a global set of embedded vectors. From there, the state estimation module 208 causes the processor(s) 110 to construct the global feature space based on the global set of embedded vectors.

The global coordinates for global feature space may be built based on the 3D information for the covisible area and the GPS information associated with each sensor of the first vehicle 100A in the second vehicle 100B. The non-covisible object location reasoning, the non-covisible object may be localized based on single view detection and global coordinate information. The estimated location information for the non-covisible objects may be shared for different applications.

Figure 12:
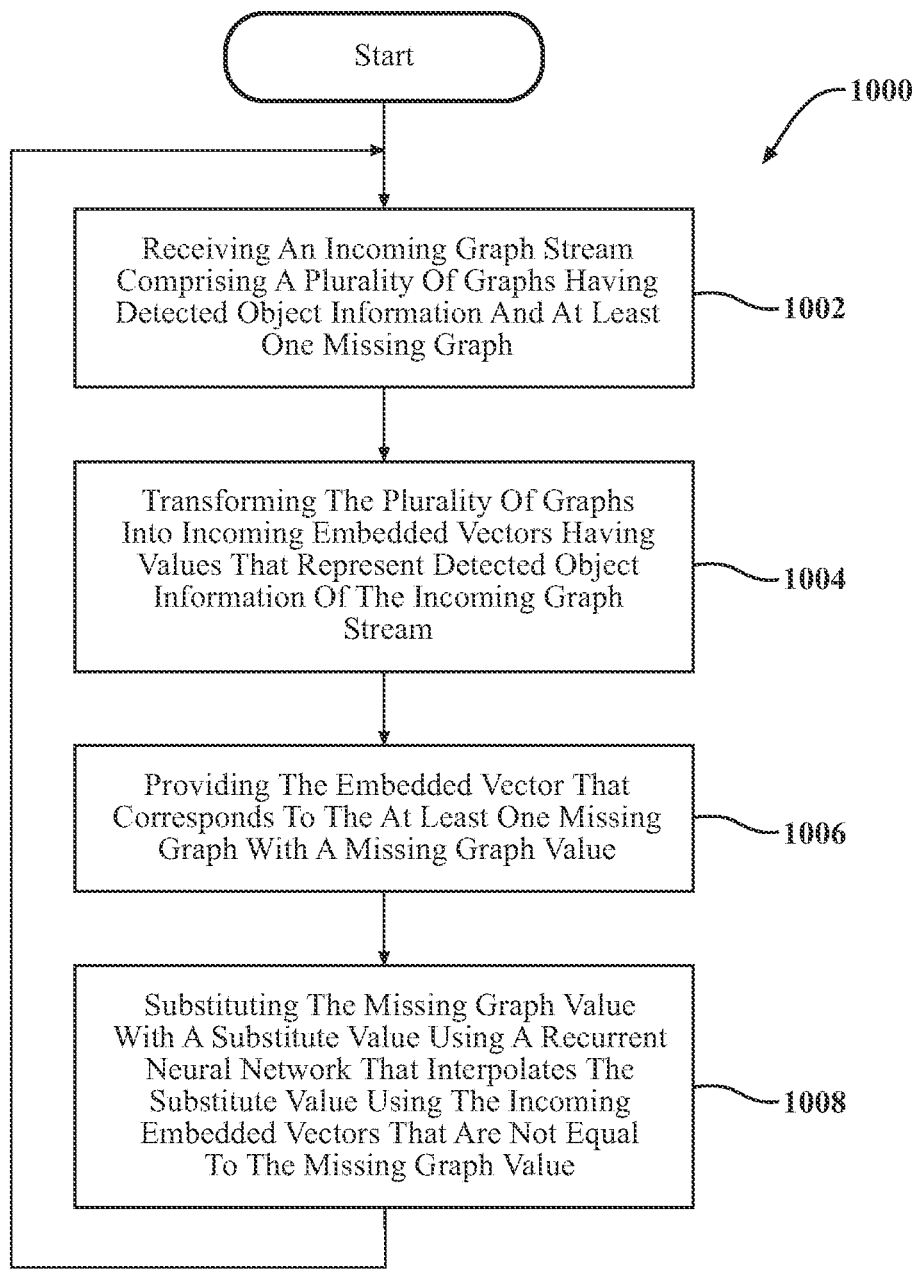
FIG. 12 illustrates a method for substituting missing graph information with substitute graph information.

Referring to FIG. 12, a method 1000 for substituting a missing graph value is shown. The method 1000 will be described from the viewpoint of the vehicle 100 of FIG. 3 and the graph processing system 170 of FIG. 4. However, it should be understood that this is just one example of implementing the method 1000. While method 1000 is discussed in combination with the graph processing system 170, it should be appreciated that the method 1000 is not limited to being implemented within the graph processing system 170 but is instead one example of a system that may implement the method 1000.

In step 1002, the vehicle 100 receives an incoming graph stream that includes a plurality of graphs having detected object information. The plurality of graphs may also include at least one missing graph. The vehicle 100 may receive the incoming graph stream by a network access device 180 connected to both the processor(s) 110 and an antenna 190 that allows the vehicle 100 to communicate with other vehicles using various wireless communication protocols.

In step 1004, the graph imputation module 206 causes the processor(s) 110 to transform the graphs of the incoming graph stream into incoming embedded vectors. If the graph stream has any missing graphs, these missing graphs are converted to vectors having a missing graph value, as indicated in step 1006. The missing graph value, and one example, could be a zero value.

In step 1008, the graph imputation module 206 causes the processor(s)110 to substitute the vector having the missing graph value with the substitute value using the Mask RNN 230 that interpolates the substitute value using the incoming vectors that are not equal to the missing graph value. In one example, Mask RNN 230 may selectively process the non-masked values (i.e., non-zero values) of the embedded vectors and ignores embedded vectors with a zero value. For its output, the Mask RNN 230 may smoothly interpolate the substitute value. In one example, the Mask RNN 230 may perform a serial analysis of the embedded vectors that do not have a zero value to interpolate the substitute value.

The method 1000, after determining the substitute value, may end or may continue again as more incoming graphs are received. In addition, as explained previously, after the substitute value is determined, other methods may be utilized, such as methods that can determine a global feature space.

Figure 13:
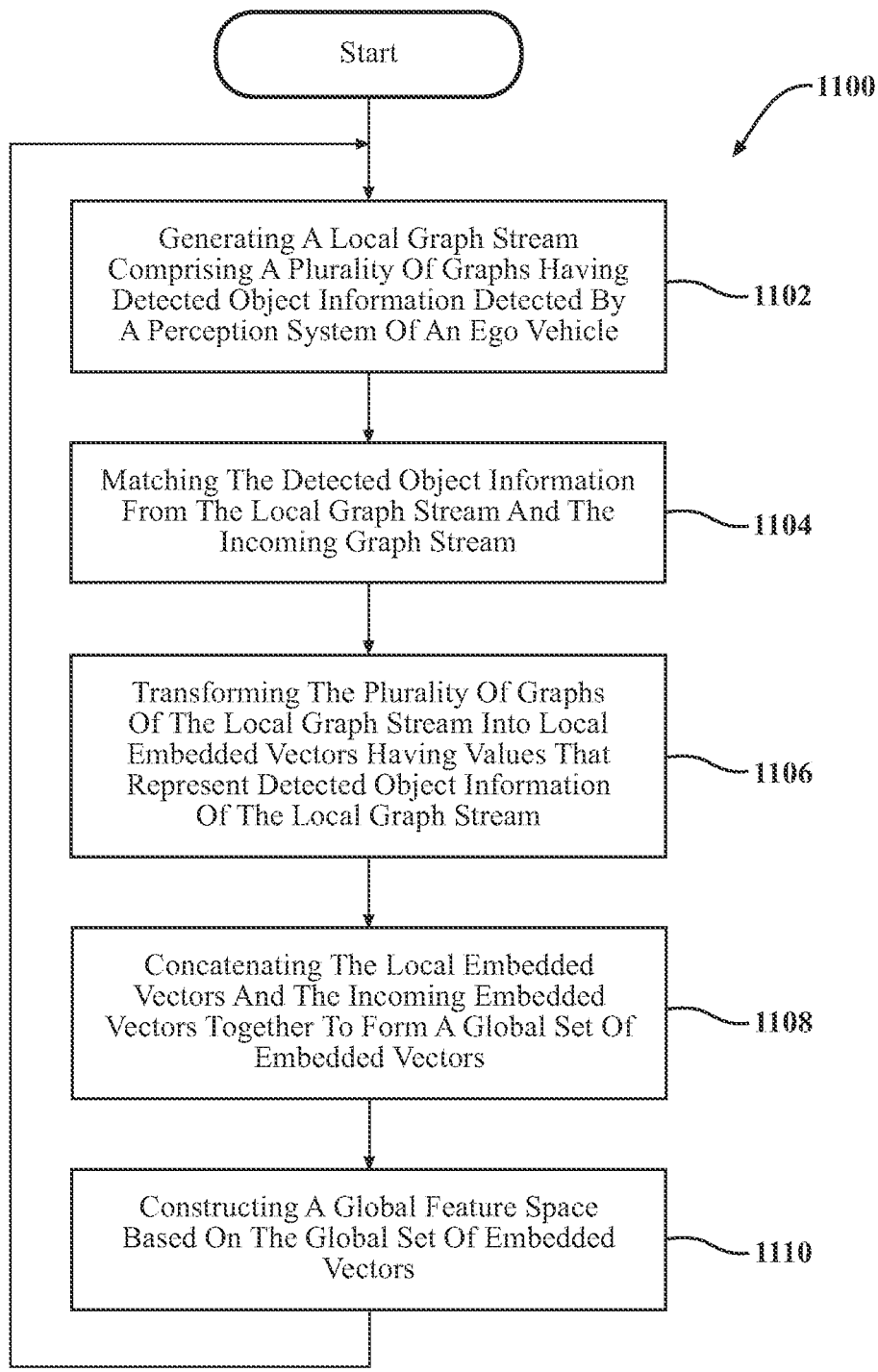
FIG. 13 illustrates a method for constructing a global feature space based on a global set of embedded vectors.

Referring to FIG. 13, a method 1100 for determining a global feature space is shown. The method 1100 will be described from the viewpoint of the vehicle 100 of FIG. 3 and the graph processing system 170 of FIG. 4. However, it should be understood that this is just one example of implementing the method 1100. While method 1100 is discussed in combination with the graph processing system 170, it should be appreciated that the method 1100 is not limited to being implemented within the graph processing system 170 but is instead one example of a system that may implement the method 1100.

In step 1102, the graph generator module 202 causes the processor(s) 110 to generate a local graph stream that may include a plurality of graphs having detected object information detected by the perception system, which may include the environment sensor(s) 122. As explained previously, the local graph stream is a graph representation to represent multiple objects observed by environment sensor(s) 122. Multiple graphs may be generated at different time intervals to describe the environment surrounding the vehicle 100 at a particular time.

In step 1104, the graph matching module 204 causes the processor(s) 110 to match the local graph stream generated in step 1102 with a received graph stream that may have been received in step 1002 of the method 1000 FIG. 12. As explained previously, the matching process may be a similarity comparison process based on a special distance metric. The theoretical principle behind the matching process is the view-invariant property of the scene. Metrics decomposition and computation may be involved to conduct further optimization and robust matching.

In step 1106, the graph imputation module 206, or another module, may cause the processor(s) 110 to transform the graphs of the local graph stream in the local embedded vectors having values that represent detected object information of the local graph stream. For example, the graph stream 504 of FIG. 10 is transformed into the local embedded vectors 904 of FIG. 11.

In step 1108, the state estimation module 208 may cause the processor(s) 110 to concatenate the local embedded vectors with the incoming embedded vectors to form a global set of embedded vectors. From there, in step 1110, the state estimation module 208 causes the processor(s) 110 to construct the global feature space based on the global set of embedded vectors.

FIG. 1 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the graph processing system 170 to ensure the vehicle 100 remains within defined state constraints.

As stated before, the vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. As used throughout this description, the term "operatively connected" or "in communication with" can include direct or indirect connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 137, and/or other suitable sensors. The vehicle sensor(s) 121 can be configured to detect, and/or sense one or more vehicle characteristics. In one or more arrangements, the vehicle sensor(s) 121 can include a speedometer to determine a current speed of the vehicle 100.

Alternatively, or in addition, the sensor system 120 can include one or more environment sensor(s) 122 configured to acquire, and/or sense driving environment data. "Driving environment data" includes data or information about the external environment in which an autonomous vehicle is located or one or more portions thereof. For example, the one or more environment sensor(s) 122 can be configured to detect, quantify, and/or sense obstacles in at least a portion of the external environment of the vehicle 100 and/or information/data about such obstacles. Such obstacles may be stationary objects and/or dynamic objects. The one or more environment sensor(s) 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensor(s) 122 and/or the one or more vehicle sensor(s) 121. However, it will be understood that the embodiments are not limited to the particular sensors described.

As an example, in one or more arrangements, the sensor system 120 can include one or more radar sensor(s) 123, one or more LIDAR sensor(s) 124, one or more sonar sensor(s) 125, and/or one or more camera sensor(s) 126. In one or more arrangements, the one or more camera sensor(s) 126 can be high dynamic range (HDR) cameras or infrared (IR) cameras.

The vehicle 100 can include an input system 140. An "input system" includes any device, component, system, element or arrangement, or groups that enable information/data to be entered into a machine. The input system 140 can receive an input from a vehicle passenger (e.g., a driver or a passenger). The vehicle 100 can include an output system 145. An "output system" includes any device, component, or arrangement, or groups thereof that enable information/data to be presented to a vehicle passenger (e.g., a person, a vehicle passenger, etc.).

The vehicle 100 can include one or more vehicle systems 130. Various examples of the one or more vehicle systems 130 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 131, a braking system 132, a steering system 133, throttle system 134, a transmission system 135, a signaling system 136, and/or a navigation system 137. Each of these systems can include one or more devices, components, and/or a combination thereof, now known or later developed.

The navigation system 137 can include one or more devices, applications, and/or combinations thereof, now known or later developed, configured to determine the geographic location of the vehicle 100 and/or to determine a travel route for the vehicle 100. The navigation system 137 can include one or more mapping applications to determine a travel route for the vehicle 100. The navigation system 137 can include a global positioning system, a local positioning system, or a geolocation system.

The processor(s) 110 and/or the autonomous driving system 160 can be operatively connected to communicate with the vehicle systems 130 and/or individual components thereof. For example, returning to FIG. 1, the processor(s) 110 and/or the autonomous driving system 160 can be in communication to send and/or receive information from the vehicle systems 130 to control the movement, speed, maneuvering, heading, direction, etc. of the vehicle 100. The processor(s) 110 and/or the autonomous driving system 160 may control some or all of these vehicle systems 130 and, thus, may be partially or fully autonomous.

The processor(s) 110 and/or the autonomous driving system 160 can be operatively connected to communicate with the vehicle systems 130 and/or individual components thereof. For example, returning to FIG. 1, processor(s) 110 and/or the autonomous driving system 160 can be in communication to send and/or receive information from the vehicle systems 130 to control the movement, speed, maneuvering, heading, direction, etc. of the vehicle 100. The processor(s) 110 and/or the autonomous driving system 160 may control some or all of these vehicle systems 130.

The processor(s) 110 and/or the autonomous driving system 160 may be operable to control the navigation and/or maneuvering of the vehicle 100 by controlling one or more of the vehicle systems 130 and/or components thereof. For instance, when operating in an autonomous mode, processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur either directly or indirectly.

The vehicle 100 can include one or more actuators 150. The actuators 150 can be any element or combination of elements operable to modify, adjust, and/or alter one or more of the vehicle systems 130 or components thereof to be responsive to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. Two or more of the modules described herein can be combined into a single module in one or more arrangements.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. The autonomous driving system 160 can use such data to generate one or more driving scene models in one or more arrangements. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, directly or indirectly. The autonomous driving system 160 can be configured to execute various vehicle functions and/or transmit data to, receive data from, interact with, and/or control the vehicle 100 or more systems (e.g., one or more of vehicle systems 130).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising steps of:
receiving, from an external source, an incoming graph stream comprising a plurality of graphs having detected object information and at least one missing graph;
transforming the plurality of graphs into incoming embedded vectors having values that represent detected object information of the incoming graph stream;
providing the embedded vector that corresponds to the at least one missing graph with a missing graph value; and
substituting the missing graph value with a substitute value using a recurrent neural network that interpolates the substitute value using the incoming embedded vectors that are not equal to the missing graph value.

2. The method of claim 1, wherein the recurrent neural network performs a serial analysis of the incoming embedded vectors that are not equal to the missing graph value to interpolate the substitute value.

3. The method of claim 2, wherein the serial analysis is bi-directional.

4. The method of claim 1, further comprising the step of interpolating the substitute value by copying one of the incoming embedded vectors that is not equal to the missing graph value.

5. The method of claim 4, wherein the one of the incoming embedded vectors copied is sequentially nearest the vector having the missing graph value.

6. The method of claim 1, wherein the external source is a remote vehicle and the detected object information is information regarding one or more objects detected by a perception system of the remote vehicle.

7. The method of claim 6, further comprising the steps:
generating a local graph stream comprising a plurality of graphs having detected object information detected by a perception system of an ego vehicle;
matching the detected object information from the local graph stream and the incoming graph stream;
transforming the plurality of graphs of the local graph stream into local embedded vectors having values that represent detected object information of the local graph stream;
concatenating the local embedded vectors and the incoming embedded vectors together to form a global set of embedded vectors; and
constructing a global feature space based on the global set of embedded vectors.

8. A system comprising:
a processor; and
a memory in communication with the processor having machine-executable instruction that, when executed by the processor, cause the processor to:
receive, from an external source, an incoming graph stream comprising a plurality of graphs having detected object information and at least one missing graph,
transform the plurality of graphs into incoming embedded vectors having values that represent detected object information of the incoming graph stream,
provide the embedded vector that corresponds to the at least one missing graph with a missing graph value, and
substitute the missing graph value with a substitute value using a recurrent neural network that interpolates the substitute value using the incoming embedded vectors that are not equal to the missing graph value.

9. The system of claim 8, wherein the recurrent neural network performs a serial analysis of the incoming embedded vectors that are not equal to the missing graph value to interpolate the substitute value.

10. The system of claim 9, wherein the serial analysis is bi-directional.

11. The system of claim 8, wherein the memory further comprises machine-readable instructions that, when executed by the processor, cause the processor to interpolate the substitute value by copying one of the incoming embedded vectors that is not equal to the missing graph value.

12. The system of claim 11, wherein the one of the incoming embedded vectors copied is sequentially nearest the vector having the missing graph value.

13. The system of claim 8, wherein the external source is a remote vehicle and the detected object information is information regarding one or more objects detected by a perception system of the remote vehicle.

14. The system of claim 13, wherein the memory further comprises machine-readable instructions that, when executed by the processor, cause the processor to:
generate local graph stream comprising a plurality of graphs having detected object information detected by a perception system of an ego vehicle;
match the detected object information from the local graph stream and the incoming graph stream;
transform the plurality of graphs of the local graph stream into local embedded vectors having values that represent detected object information of the local graph stream;
concatenate the local embedded vectors and the incoming embedded vectors together to form a global set of embedded vectors; and
construct a global feature space based on the global set of embedded vectors.

15. A non-transitory computer readable medium having instructions that, when executed by a processor, cause the processor to:
receive, from an external source, an incoming graph stream comprising a plurality of graphs having detected object information and at least one missing graph; and
transform the plurality of graphs into incoming embedded vectors having values that represent detected object information of the incoming graph stream;

provide the embedded vector that corresponds to the at least one missing graph with a missing graph value; and substitute the missing graph value with a substitute value using a recurrent neural network that interpolates the substitute value using the incoming embedded vectors that are not equal to the missing graph value.

16. The non-transitory computer readable medium of claim 15, wherein the recurrent neural network performs a serial analysis of the incoming embedded vectors that are not equal to the missing graph value to interpolate the substitute value.

17. The non-transitory computer readable medium of claim 15, further comprising instructions that, when executed by the processor, cause the processor to interpolate the substitute value by copying one of the incoming embedded vectors that is not equal to the missing graph value.

18. The non-transitory computer readable medium of claim 17, wherein the one of the incoming embedded vectors copied is sequentially nearest the vector having the missing graph value.

19. The non-transitory computer readable medium of claim 15, wherein the external source is a remote vehicle and the detected object information is information regarding one or more objects detected by a perception system of the remote vehicle.

20. The non-transitory computer readable medium of claim 19, further comprising instructions that, when executed by the processor, cause the processor to:
  generate a local graph stream comprising a plurality of graphs having detected object information detected by a perception system of an ego vehicle;
  match the detected object information from the local graph stream and the incoming graph stream;
  transform the plurality of graphs of the local graph stream into local embedded vectors having values that represent detected object information of the local graph stream;
  concatenate the local embedded vectors and the incoming embedded vectors together to form a global set of embedded vectors; and
  construct a global feature space based on the global set of embedded vectors.

* * * * *